United States Patent
Lewis et al.

(10) Patent No.: US 9,114,587 B2
(45) Date of Patent: Aug. 25, 2015

(54) METHOD FOR FORMING BENDS IN COMPOSITE PANELS AND COMPOSITE PANELS MADE THEREBY

(71) Applicant: The Boeing Company, Chicago, IL (US)

(72) Inventors: Michael S. Lewis, Lake Forest Park, WA (US); Guy W. Roets, Duvall, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/660,554

(22) Filed: Oct. 25, 2012

(65) Prior Publication Data
US 2013/0071612 A1    Mar. 21, 2013

Related U.S. Application Data

(60) Division of application No. 12/253,957, filed on Oct. 18, 2008, now Pat. No. 8,312,754, which is a continuation-in-part of application No. 11/924,125, filed on Oct. 25, 2007, now Pat. No. 8,234,901.

(51) Int. Cl.
| | |
|---|---|
| *B32B 3/04* | (2006.01) |
| *B32B 3/10* | (2006.01) |
| *B26D 3/06* | (2006.01) |
| *B29C 53/06* | (2006.01) |
| *B32B 3/12* | (2006.01) |
| *B32B 3/26* | (2006.01) |
| *B26D 5/20* | (2006.01) |
| *B29L 9/00* | (2006.01) |

(52) U.S. Cl.
CPC . *B32B 3/04* (2013.01); *B26D 3/065* (2013.01); *B29C 53/063* (2013.01); *B32B 3/12* (2013.01); *B32B 3/266* (2013.01); *B26D 5/20* (2013.01); *B29C 2793/0009* (2013.01); *B29L 2009/00* (2013.01)

(58) Field of Classification Search
USPC .................................................. 428/121, 136
See application file for complete search history.

(56) References Cited

U.S. PATENT DOCUMENTS

| | | | |
|---|---|---|---|
| 1,602,164 | A | 10/1926 | Overbury |
| 2,135,000 | A | 11/1938 | Crouch |
| 2,142,305 | A | 1/1939 | Davis |
| 2,505,789 | A | 5/1950 | Norquist |
| 2,922,561 | A | 1/1960 | Currivan |

(Continued)

FOREIGN PATENT DOCUMENTS

| | | |
|---|---|---|
| FR | 2409855 | 11/1977 |
| WO | WO9410406 A1 | 5/1994 |

(Continued)

OTHER PUBLICATIONS

Office Action, dated May 16, 2013, regarding U.S. Appl. No. 13/566,562, 27 pages.

(Continued)

*Primary Examiner* — Maria Veronica Ewald
*Assistant Examiner* — Nathan Van Sell
(74) *Attorney, Agent, or Firm* — Yee & Associates, P.C.

(57) ABSTRACT

A composite panel with a bend therein is formed by first and second adjacent panel sections having a common facesheet forming an outer radius of the bend, and a substantially void-free joint between the adjacent panel sections.

7 Claims, 7 Drawing Sheets

(56) References Cited

U.S. PATENT DOCUMENTS

| | | |
|---|---|---|
| 3,122,302 A | 2/1964 | Wood |
| 3,341,908 A | 9/1967 | Lock |
| 3,456,380 A | 7/1969 | Cameron |
| 3,890,108 A | 6/1975 | Welsh |
| 3,969,868 A | 7/1976 | Bainter et al. |
| 4,024,684 A | 5/1977 | Holmgren |
| 4,387,128 A | 6/1983 | Emms et al. |
| 4,671,470 A | 6/1987 | Jonas |
| 4,715,592 A | 12/1987 | Lewis |
| 4,887,335 A | 12/1989 | Folkmar |
| 4,917,747 A | 4/1990 | Chin et al. |
| 5,125,133 A | 6/1992 | Morrison |
| 5,331,758 A | 7/1994 | Romick |
| 5,357,728 A | 10/1994 | Duncanson |
| 5,509,212 A | 4/1996 | Henricksen |
| 5,557,904 A | 9/1996 | Dahowski |
| 5,652,039 A | 7/1997 | Tremain et al. |
| 5,653,003 A | 8/1997 | Freeman |
| 5,742,983 A | 4/1998 | Lo |
| 5,755,068 A | 5/1998 | Ormiston |
| 5,919,545 A | 7/1999 | Giezendanner et al. |
| 5,940,935 A | 8/1999 | Julius |
| 6,164,477 A | 12/2000 | Druckman et al. |
| 6,251,497 B1 | 6/2001 | Hoopingarner et al. |
| 6,295,786 B1 | 10/2001 | Lee |
| 6,325,568 B1 | 12/2001 | Druckman et al. |
| 6,372,322 B1 | 4/2002 | Devaguptapu |
| 6,453,973 B1 | 9/2002 | Russo |
| 6,685,085 B2 | 2/2004 | Hanna |
| 6,797,364 B2 | 9/2004 | Okada et al. |
| 6,948,651 B2 | 9/2005 | Ikeda |
| 6,968,971 B2 | 11/2005 | Ely |
| 7,013,535 B2 | 3/2006 | Tracy |
| 7,188,456 B2 | 3/2007 | Knauseder |
| 7,302,150 B2 | 11/2007 | Druckman et al. |
| 7,416,363 B2 | 8/2008 | Kozhuev |
| 7,534,501 B2 | 5/2009 | Durney |
| 7,887,249 B2 | 2/2011 | Schmitz |
| 7,963,038 B2 | 6/2011 | Schmitz |
| 8,234,901 B2 | 8/2012 | Lewis et al. |
| 8,312,754 B2 | 11/2012 | Lewis |
| 2007/0289246 A1 | 12/2007 | Schmitz |
| 2007/0289248 A1 | 12/2007 | Schmitz |
| 2009/0107312 A1 | 4/2009 | Lewis et al. |
| 2009/0110879 A1 | 4/2009 | Lewis et al. |
| 2009/0314463 A1 | 12/2009 | Frobosilo et al. |
| 2010/0247849 A1 | 9/2010 | Depaoli et al. |
| 2012/0237717 A1 | 9/2012 | Dunn |
| 2013/0029107 A1 | 1/2013 | Lewis et al. |

FOREIGN PATENT DOCUMENTS

| | | |
|---|---|---|
| WO | WO2004104314 A2 | 12/2004 |
| WO | WO2008105789 A2 | 9/2008 |

OTHER PUBLICATIONS

Final Office Action, dated Oct. 24, 2013, regarding U.S. Appl. No. 13/566,562, 21 pages.

Office Action, dated Mar. 21, 2014, regarding U.S. Appl. No. 13/566,562, 31 pages.

Lewis et al., "Apparatus to Create Bends in Composite Panels," U.S. Appl. No. 13/566,562, filed Aug. 3, 2012, 36 pages.

International search report dated Feb. 2, 2009 regarding Application No. PCT/US2007/014122, 5 pages.

USPTO Notice of Allowance, dated Apr. 3, 2012, regarding U.S. Appl. No. 11/924,125, 11 pages.

USPTO Final Office Action, dated May 12, 2011, regarding U.S. Appl. No. 11/924,125, 14 pages.

USPTO Office Action, dated Nov. 24, 2010, regarding U.S. Appl. No. 11/924,125, 14 pages.

USPTO Final Office Action, dated Apr. 15, 2010, regarding U.S. Appl. No. 11/424,246, 11 pages.

USPTO Notice of Allowance, dated Jan. 5, 2011, regarding U.S. Appl. No. 11/424,246, 6 pages.

USPTO Office Action, dated Jul. 28, 2010, regarding U.S. Appl. No. 11/424,246, 8 pages.

USPTO Office Action, dated Oct. 26, 2009, regarding U.S. Appl. No. 11/424,246, 14 pages.

USPTO Notice of Allowance, dated Apr. 6, 2011, regarding U.S. Appl. No. 11/727,762, 11 pages.

USPTO Notice of Allowance, dated Jul. 9, 2010, regarding U.S. Appl. No. 11/727,762, 9 pages.

USPTO Notice of Allowance dated Mar. 20, 2012, regarding U.S. Appl. No. 12/253,957, 7 pages.

USPTO Office Action dated Dec. 8, 2011, regarding U.S. Appl. No. 12/253,957, 9 pages.

Notice of Allowance, dated Jun. 24, 2014, regarding U.S. Appl. No. 13/566,562, 10 pages.

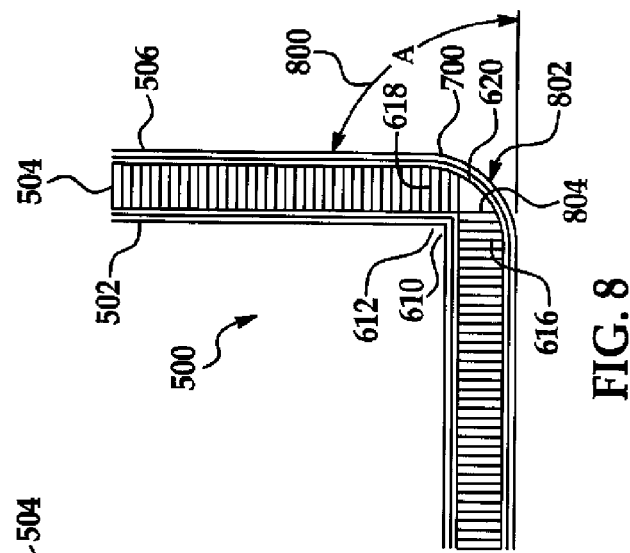
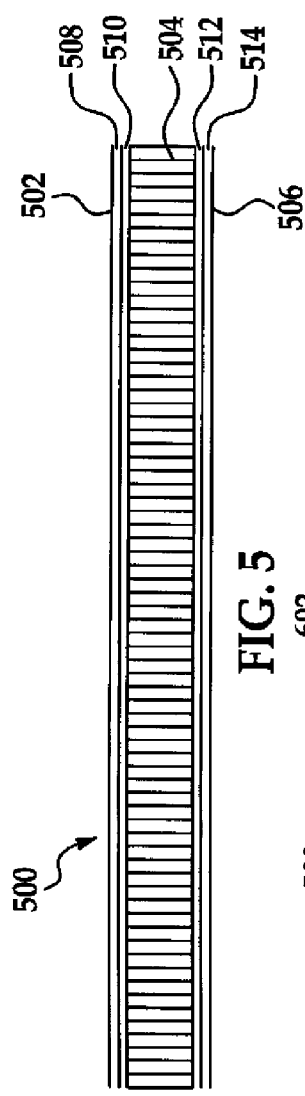
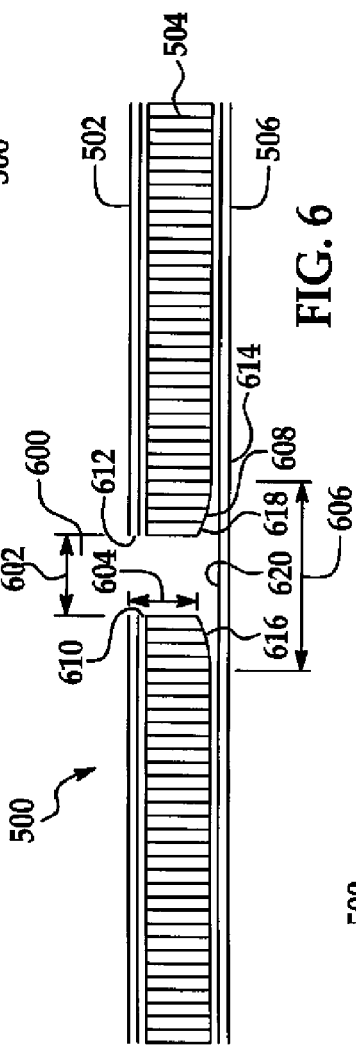
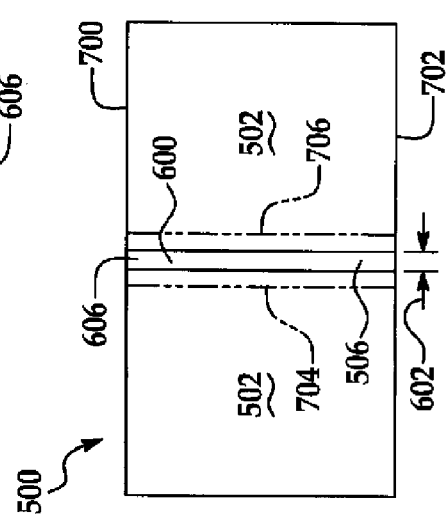

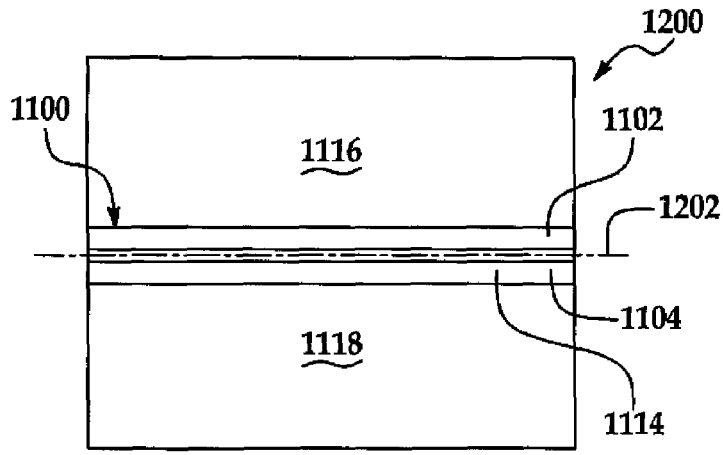
FIG. 12
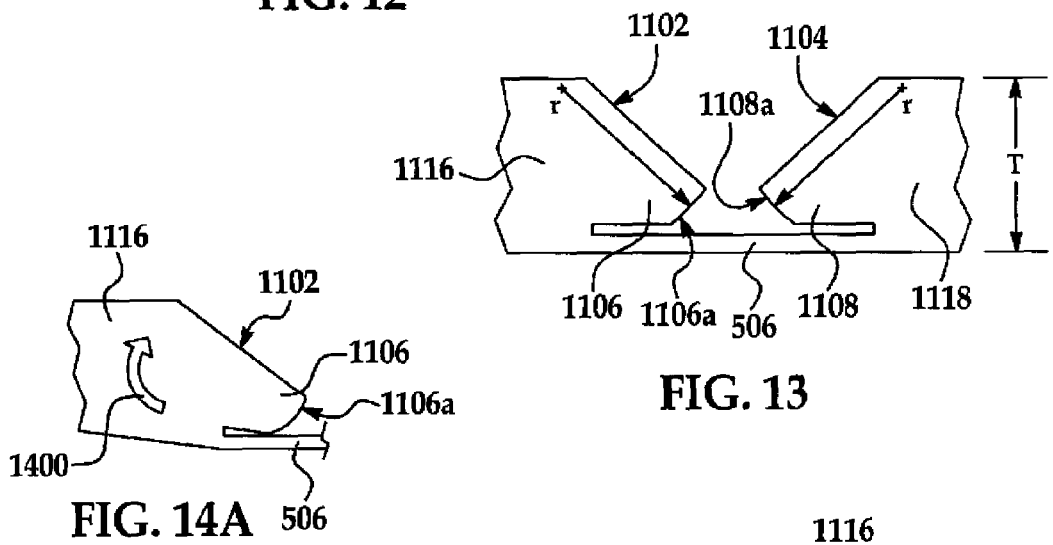
FIG. 13
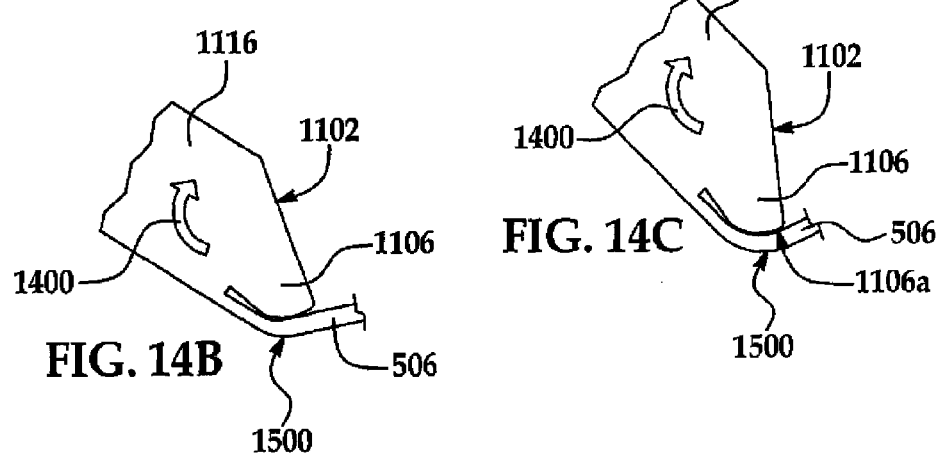
FIG. 14A
FIG. 14B
FIG. 14C

METHOD FOR FORMING BENDS IN COMPOSITE PANELS AND COMPOSITE PANELS MADE THEREBY

CROSS REFERENCE TO RELATED APPLICATIONS

This application is a divisional application of U.S. patent application Ser. No. 12/253,957, filed Oct. 18, 2008, status Allowed, which is a continuation-in-part of U.S. patent application Ser. No. 11/924,125 filed Oct. 25, 2007, now U.S. Pat. No. 8,234,901, issued on Aug. 7, 2012.

TECHNICAL FIELD

This disclosure relates generally to composite structures, and deals more particularly with a method for forming a bend in a composite panel, and a composite panel formed thereby.

BACKGROUND

Composite panels may be used in a variety of applications because of their relatively high strength-to-weight ratio. For example, composite panels are often used to form interior components of an aircraft such as, without limitation, floor panels, lavatories, walls, closets, dividers between seating sections, and headers above doorways. In some cases, the composite panel may have an angled section referred to as a bend, formed by the intersection of two separate composite panels. In other cases, the bend may be integrally formed within a single panel.

The current technique for forming an integral bend in a composite panel involves laying up uncured composite plies on a mold or other suitable tool having angled tool features that impart the bend to the layup. During curing of the layup, the bend becomes permanently set in the panel. This approach, however, is time consuming, labor intensive and may require a separate mold for each particular panel.

It has also been proposed to form bends in composite panels by forming a slot in the panel and then bending the panel about the longitudinal axis of the slot. The slot is formed by removing a strip of material from the panel. However, after the panel is bent to the required angle, voids may remain in the slot where material has been removed to form the slot. These voids must be filled with a filler in order to assure that a solid joint has been formed that exhibits the necessary structural strength. The voids may be filled using, for example and without limitation, a potting compound. Use of fillers is time consuming, labor intensive, adds weight to the panel and requires a waiting period for the potting compound to harden.

Accordingly, there is a need for a composite panel having a substantially void-free bend therein, and a method for making the same that overcomes the problems discussed above.

SUMMARY

In accordance with the disclosed embodiments, a bend may be formed in a composite panel that reduces or eliminates voids in the area of the bend. A slot is formed in the panel having a unique geometry which closes upon bending of the panel to form a substantially void-free, solid joint. The geometric features of the slot provide substantially continuous support for the outer radius of the bend and permit an outer bend radius to be achieved that is substantially equal to the thickness of the panel. Since the joint is substantially void-free, the need for fillers and secondary operations may be reduced or eliminated.

According to one disclosed embodiment, a method is provided for forming a bend in a composite panel, comprising: forming a slot in a face of the panel, the slot having a longitudinal axis and including first and second surfaces each inclined relative to the face of the panel; forming a pair of curved flanges in the panel respectively beneath the first and second inclined surfaces; and, bending the panel about the longitudinal axis of the slot. Bending the panel includes bringing the first and second inclined surfaces into face-to-face contact over substantially their entire areas, and bringing the curved flanges into conformal engagement with the inside wall of a facesheet on the panel. The slot may be formed by passing a single cutting tool longitudinally through the panel.

According to another embodiment, a substantially flat composite panel having adjacent sections that may be formed into a bend having a radiused corner comprises: first and second facesheets; a core sandwiched between the first and second facesheets; and, a slot in the first facesheet extending into the core. The slot has a longitudinal axis about which the adjacent panel sections may be displaced to form the bend. The slot includes a generally V-shaped portion extending through the first facesheet into the core, and the first and second curved flange portions between the V-shape portion and the second facesheet. The curvature of each of the first and second curve flange portions may be substantially equal to the curvature of the bend. The first and second curved portions conformally engage and support an inside wall of the second facesheet when the adjacent panel sections are formed into the bend.

According to a further embodiment, a composite panel having a bend therein comprises: first and second adjacent panel sections having a common facesheet forming an outer radius of the bend; and a substantially void-free joint between the adjacent panel sections. The joint may include first and second surfaces respectively on the first and second panel sections joined together along a plane passing substantially through the radius of the bend. Each of the panel sections may include a core joined to the common facesheet around substantially the entire outer radius of the bend. The radius of the bend may be substantially equal to the thickness of the panel.

The disclosed embodiments satisfy the need for a composite panel having a bend formed by a joint that is substantially void-free, with and without bonding.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIG. 5 is an illustration of a cross-sectional view of a composite panel in accordance with an advantageous embodiment;

FIG. 6 is an illustration of a slot in accordance with an advantageous embodiment;

FIG. 7 is an illustration of a top view of a composite panel in accordance with an advantageous embodiment;

FIG. 8 is an illustration of a composite panel in a bent configuration in accordance with an advantageous embodiment;

FIG. 12 is a plan view illustration of the panel shown in FIG. 11.

FIG. 13 is a diagrammatic view illustrating the radii of the curved flanges formed by the slot shown in FIG. 11.

FIGS. 14a-14c illustrate the progressive rotation of one of the curved flanges into conformal engagement with the common facesheet as the panel is being bent.

DETAILED DESCRIPTION

Figure 1:
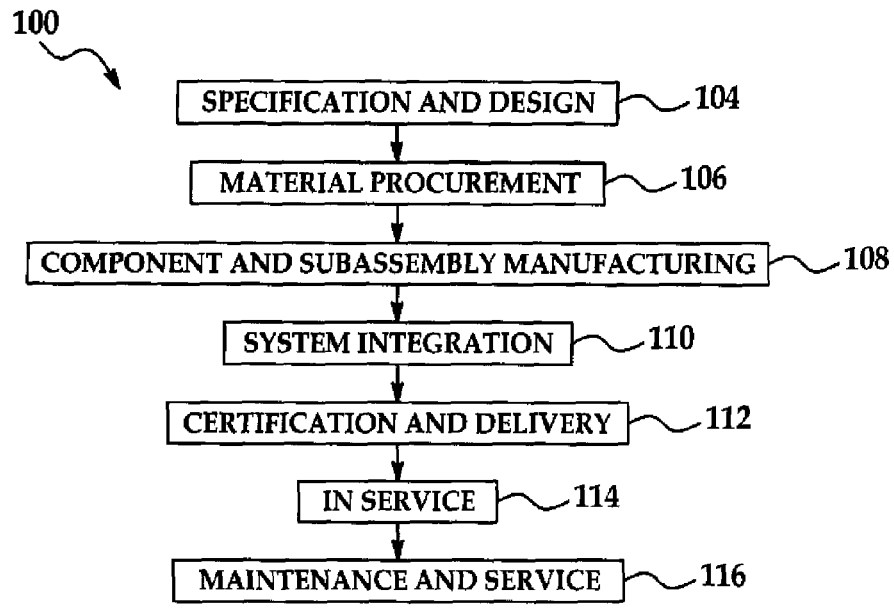
FIG. 1 is a flow diagram of aircraft production and service methodology in which an advantageous embodiment may be implemented.
Figure 2:
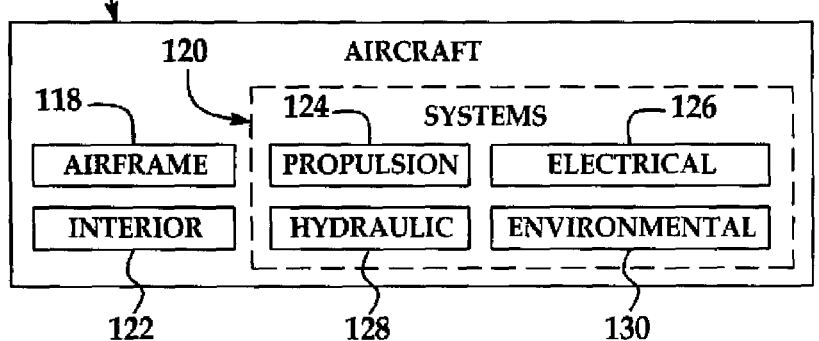
FIG. 2 is a block diagram of an aircraft in accordance with an advantageous embodiment.

Referring more particularly to the drawings, embodiments of the disclosure may be described in the context of aircraft manufacturing and service method 100 as shown in FIG. 1 and aircraft 102 as shown in FIG. 2. During pre-production, exemplary method 100 may include specification and design 104 of aircraft 102 and material procurement 106. During production, component and subassembly manufacturing 108 and system integration 110 of aircraft 102 takes place. Thereafter, aircraft 102 may go through certification and delivery 112 in order to be placed in service 114. While in service 114 by a customer, aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced by exemplary method 100 may include airframe 118 with a plurality of systems 120 and interior 122. Examples of high-level systems 120 include one or more of propulsion system 124, electrical system 126, hydraulic system 126, and environmental system 130. Any number of other systems may be included. Although an aerospace example is shown, the principles of the disclosure may be applied to other industries, such as the automotive industry.

Apparatus and methods embodied herein may be employed during any one or more of the stages of production and service method 100. For example, components or subassemblies corresponding to production process 108 may be fabricated or manufactured in a manner similar to components or subassemblies produced while aircraft 102 is in service. Also, one or more apparatus embodiments, method embodiments, or a combination thereof may be utilized during production stages 108 and 110, for example, by substantially expediting assembly of or reducing the cost of aircraft 102. Similarly, one or more of apparatus embodiments, method embodiments, or a combination thereof may be utilized while aircraft 102 is in service, for example and without limitation, to maintenance and service 116.

The different advantageous embodiments recognize that the current methods for creating bends in composite panels may be time consuming and costly. The different advantageous embodiments recognize that manufacturing and creating composite panels by curing the composite panels with the desired angle may be complex, requiring a tool for each part and desired angle.

Thus, the different advantageous embodiments provide a method and apparatus for forming a bend in a composite panel. A location may be identified for the bend in the composite panel. A slot having a curved flange is formed at the location in the composite panel. The composite panel may then be bent to form the bend. In these examples, the curved flange may be designed to minimize the amount of space left within the composite panel when the composite panel is bent into an angled shape.

Figure 3:
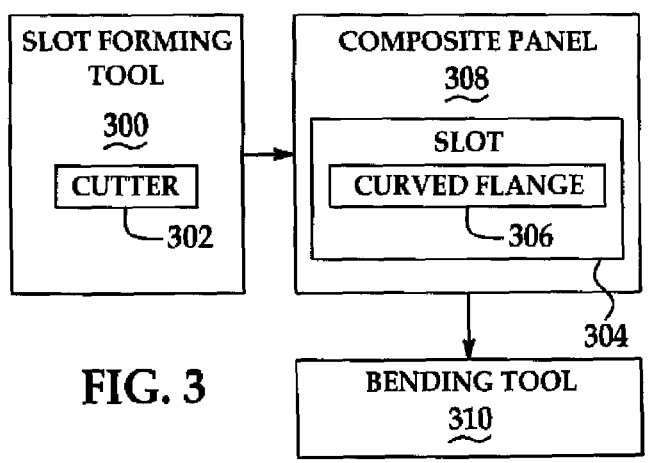
FIG. 3 is a block diagram of components used to create bends in composite panels in accordance with an advantageous embodiment.

With reference now to FIG. 3, a block diagram of components used to create bends in composite panels is depicted in accordance with an advantageous embodiment. In this example, slot forming tool 300 may include cutter 302. Slot forming tool 300, with cutter 302, may be used to cut slot 304 with curved flange 306 in composite panel 308. Composite panel 308 may then be bent into the desired shape. Bending tool 310 may not be required, in these examples. Composite panel 308 may be bent into the desired shape by hand, without any other tools. In some embodiments, bending tool 310 may be, for example, a computer or human controlled machine that bends composite panel 308 into the desired shape for assembly with other components. In another example, bending tool 310 may merely be a mold on which composite panel 308 may be bent for further processing.

In these examples, slot forming tool 300 may take various forms. For example, without limitation, slot forming tool 300 may be a computer numerical control (CNC) router. A non-limiting example of a computer numerical control that may be implemented as slot forming tool 300 may be a Cincinnati Milacron 3-Access Computer Numerical Control Router, which is available from MAG Cincinnati. Of course, any numerical control (NC) or manual router capable of cutting slot 304 may be used. In other non-limiting examples, slot forming tool 300 may be implemented using a handheld or hand controlled router.

In the different advantageous embodiments, slot 304 with curved flange 306 is formed with cutter 302. Cutter 302 may have a shape for slot 304 with curved flange 306 such that movements of cutter 302 through composite panel 308 form slot 304 with curved flange 306. In these examples, composite panel 308 may already be cured.

Figure 4:
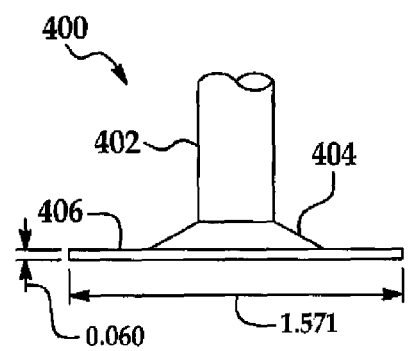
FIG. 4 is an illustration of a cutter in accordance with an advantageous embodiment.

Turning now to FIG. 4, an illustration of cutter 400 is depicted in accordance with an advantageous embodiment. Cutter 400 is an example cutter 302 used by slot forming tool 300 in FIG. 3. In this example, cutter 400 has shaft 402 and flanged end 404. Cutter 400 may be used to create a slot, such as slot 304 in FIG. 3. Flanged end 404 may have a width or diameter that may be around 1.571 inches, in this example. Further, edge 406 of flanged end 404 may have a thickness of around 0.06 inches.

In this example, the dimensions of cutter 400 may be used to process a composite panel that may be around 0.5 inches thick to form a radius bend of 1.0 inches. A radius bend is a radius corresponding to the curvature of a bent panel, in these examples. The curvature may be measure from the inside or outside surface of the bend. Cutter 400 may be made from different materials, such as, for example, without limitation, steel, aluminum composite, or any other suitable material. These and other dimensions provided in the various advantageous embodiments are merely examples of one implementation. Other advantageous embodiments may use other dimensions or parameters.

Turning now to FIG. 5, an illustration of a cross-sectional view of composite panel 500 is depicted in accordance with an advantageous embodiment. In this example, composite panel 500 may be a composite panel similar to composite panel 308 in FIG. 3. Composite panel 500 may include composite layer 502, also referred to as a first face sheet, filler layer 504, and composite layer 506 or second face sheet.

Composite layer 502 may be formed from two composite plies, plies 508 and 510. In a similar fashion, composite layer 506 also may include two composite plies, plies 512 and 514. The number of plies or sub-layers that form composite layers 502 and 506 may vary, depending on the particular implementation. For example, in some implementations, one ply may be used, while in other implementations three plies may be used. The exact number of plies may vary, depending on the particular use and/or implementation. Examples of orientations include, for example, without limitation, ply directions of 0 degrees, degrees, and 90 degrees; and ply directions of 0 degrees, 60 degrees, and 90 degrees.

In these examples, the materials that may be used in composite layers 502 and 506 may take the form of a resin pre-impregnated fabric. This type of fabric also may be referred to as a pre-preg fabric. These types of reinforcements may take the form of woven fabrics, roving, and unidirectional tape. With this type of fabric, the resin and curing agent may be impregnated into a reinforcing fiber or material prior to layup. In these particular examples, composite layers 502 and 506 may be, for example, without limitation, resin pre-impregnated fabrics with polyester and fiberglass, phenolic and fiberglass, epoxy and carbon fiber, epoxy, fiberglass, metallic, foil, screen, or any other suitable material.

Filler layer 504 may be formed using a number of different materials. For example, without limitation, nomex® fibers, fiberglass, arimid, metallic, or other suitable materials may be used for filler layer 504. In these examples, filler layer 504 also may have a shape of a honeycomb matrix to form a honeycomb core. Filler layer 504 may provide a structure to create the thickness desired for composite panel 500 without using heavy materials, such as those that may be found in composite layers 502 and 506.

In this example, composite panel 500 is around one inch thick. The thickness of composite panel 500 may vary, depending on the particular implementation. Examples of ranges include, for example, without limitation, between around 0.375 inches to around 1.5 inches, or any other suitable range.

Composite panel 500 may be, in other examples, a range from around 0.25 inches to around 2.5 inches thick. In these examples, the radius bend may be up to around 3.4 times the thickness of composite panel 500. With these ranges, composite panel 500 may have a bend radius of up to around 1.7 inches when composite panel 500 is around 0.5 inches thick. When composite panel 500 is around 1 inch thick, this panel may have a bend radius of up to around 3.47 inches when composite panel 500 is around 0.5 inches thick. These examples are merely for purposes of illustration and the dimensions may vary as implementations vary.

With reference now to FIG. 6, an illustration of slot 600 is depicted in accordance with an advantageous embodiment. In these examples, slot 600 may be formed after curing composite panel 500. A tool, such as cutter 400 in FIG. 4, may be used to form a slot within composite panel 500 in FIG. 5.

In this example, slot 600 may be been formed within composite panel 500. Slot 600 may be formed in a single pass of a tool, such as cutter 400 in FIG. 4, through composite panel 500 in FIG. 5. Slot 600 may have a width of bend slot width 602 along section 604. Thereafter, slot 600 widens in width to bend slot allowance width 606. The widening of the width of slot 600 increases to form curved flange 608. In this particular example, bend slot allowance width 606 may have a width of around 1.571 inches, corresponding to the width of flanged end 404 in cutter 400 in FIG. 4.

When composite panel 500 is bent, edges 610 and 612 meet while surface 614 may bend to form a curved surface. Surface 616 and surface 618, in filler layer 504, touch surface 620 of composite layer 506 when composite panel 500 is moved into a bent configuration. The configuration of slot 600 with curved flange 608 may allow composite panel 500 to be bent at an angle in a manner that reduces or minimizes the amount of open space within slot 600 when composite panel 500 is bent into an angled shape.

In these examples, a curve of surfaces 616 and 618 may reduce the amount of space present in slot 600 when composite panel 500 is bent into the desired configuration. The curve of surfaces 616 and 618 may be configured or selected in a manner that reduces the amount of open space within composite panel 500 when composite panel 500 is in the angled shape. The curve of surfaces 616 and 618 may have a curve that is similar to a desired radius bend for composite panel 500 when composite panel 500 is in the angled shape. In other words, curves for surfaces 616 and 618 may have a radius bend around or substantially the same as a radius bend for composite panel 500 in the angled shape.

Turning now to FIG. 7, an illustration of a top view of composite panel 500 is depicted in accordance with an advantageous embodiment. As can be seen in this particular example, slot 600 may extend from side 700 to side 702 of composite panel 500. In creating slot 600, a cutter tool, such as cutter tool 400 in FIG. 4, may be moved along composite panel 500 from side 700 to side 702 to create slot 600. Dotted lines 704 and 706 may illustrate the location of bent slot allowance 606, which is not visible in this view.

Turning now to FIG. 8, an illustration of composite panel 500 in a bent configuration is depicted in accordance with an advantageous embodiment. In this example, composite panel 500 may have angle 800. This angle is around ninety degrees, in this example. Angle 800, of course, may vary, depending of the particular embodiment. For example, angle 800 may be seventy-five degrees, eighty degrees, one-hundred twenty degrees, or any other suitable angle. The selection of angle 800, as well as other parameters, such as, for example, without limitation, the thickness of composite panel 500 and the desired corner radius of curved section 802, may affect the parameters for the curve of surfaces 616 and 618.

As can be seen in this example, edges 610 and 612 in composite panel 500 may meet and touch each other with composite panel 500 in the angled shape. Surface 614 of composite layer 506 now may have a radius bend at section 802, which may also be referred to as a corner radius. In the angled shape, surface 616 and surface 618, in filler layer 504, may touch or meet surface 620 of composite layer 506. In some embodiments, a single or multiple ply bend composite doubler may be bonded over the intersection of edge 610 and edge 612. In other embodiments, an aluminum angle bracket may be fastened or bolted over the joint or bend.

In this depicted example, channel 804 may be present within composite panel 500. In the different advantageous embodiments, the size or volume of channel 804 may be reduced or minimized through the configuration of slot 600 with curved flange 608. By reducing the volume or size of channel 804, a need for placing a filler into channel 804 may be minimized or avoided.

Depending on the configuration of slot 600, a filler may be required, in some advantageous embodiments. These other embodiments may employ a substantially straight surface to form a flange that is straight, rather than curved, such as curved flange 608 in FIG. 6. By using a filler, however, the time needed to manufacture composite panel 500 may increase because of the time needed to cure the filler. Further, the use of a filler also may add weight to composite panel 500.

Figure 9:
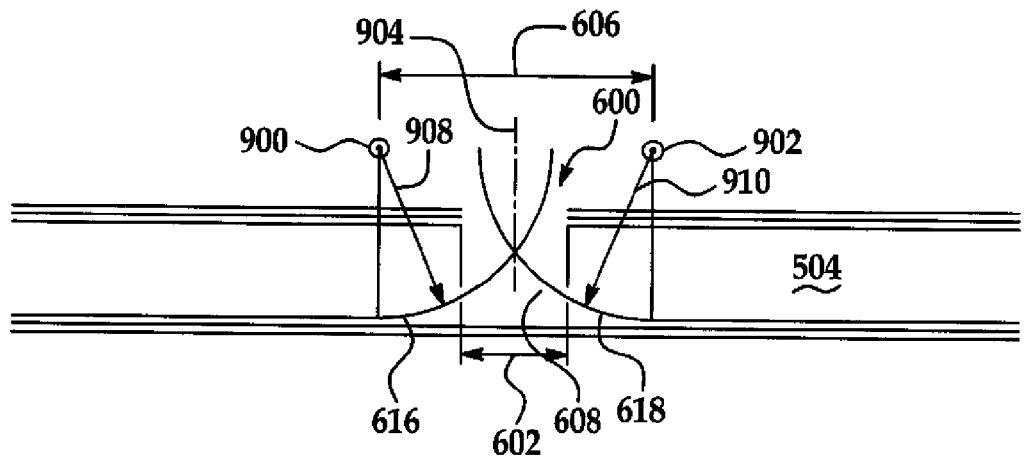
FIG. 9 is an illustration of parameters that may be used to select the configuration for a slot with a curved flange in accordance with an advantageous embodiment.

With reference now to FIG. 9, an illustration of parameters that may be used to select the configuration for slot 600 with curved flange 608 is depicted in accordance with an advantageous embodiment. In these examples, bend slot width 602 may be identified using the following:

$$BA = 2\pi R * \frac{A}{360}$$

BA may be bend slot allowance width 606 and R may be the corner radius. In this example, A may be an end angle, such as angle 800 in FIG. 8.

In these examples, bend slot width 602 may be selected as follows:

$$BS = BA - 2K(R-T)$$

BS may be the bent slot width, BA may be the bend allowance width, K may be TAN(A/2), and T may be the thickness of composite panel 500.

The curve of surfaces 616 and 618 may be selected as an intersection of the cut between bend slot allowance width 606 and a radius as described in the following. In this particular example, surface 618 may be defined as a selected distance from a center of radius for points 900 and 902. Points 900 and 902 may be selected as being the same distance from centerline 904. In these examples, points 900 and 902 may be located at distance of around one-half of bent slot allowance width 606 from centerline 904.

Additionally, points 900 and 902 may be selected to be a distance vertical from surface 614 of composite layer 506. In these examples, the vertical distance may be the value of the radius selected for the angled shape of composite panel 500. In these examples, the radius may be around one inch. As a result, points 900 and 902 may be around one inch away from composite layer 506. In this example, points 900 and 902 are the radius value above the bottom of composite layer 506.

Each portion of surface 616 has a distance that is substantially or around distance 908 from point 900. In a similar fashion, each point along surface 618 may have distance 910 from point 902. In these examples, distances 908 and 910 may be the same values and may be selected as being the radius value desired for composite panel 500. In other words, surfaces 616 and 618 have a configuration or shape that may be similar to the radius bend for surface 614 when composite panel 500 is in the angled shape.

By designing surfaces 616 and 618 in this manner, the amount of filler layer 504 remaining may be decreased, minimized, or eliminated. Consequently, the space present in slot 600 may be minimized when composite panel 500 is placed into the angled shape.

In these examples, surfaces 616 and 618 are illustrated as being curves that are smooth. In other advantageous embodiments, these surfaces may be formed with segments rather than an entirely smooth curve. Further, the different measurements and points described above are presented for purposes of illustrating non-limiting examples of configurations for slot 600. These selected configurations may then be used to create a tool, such as cutter 400 in FIG. 4, to create slot 600 in the desired shape.

Figure 10:
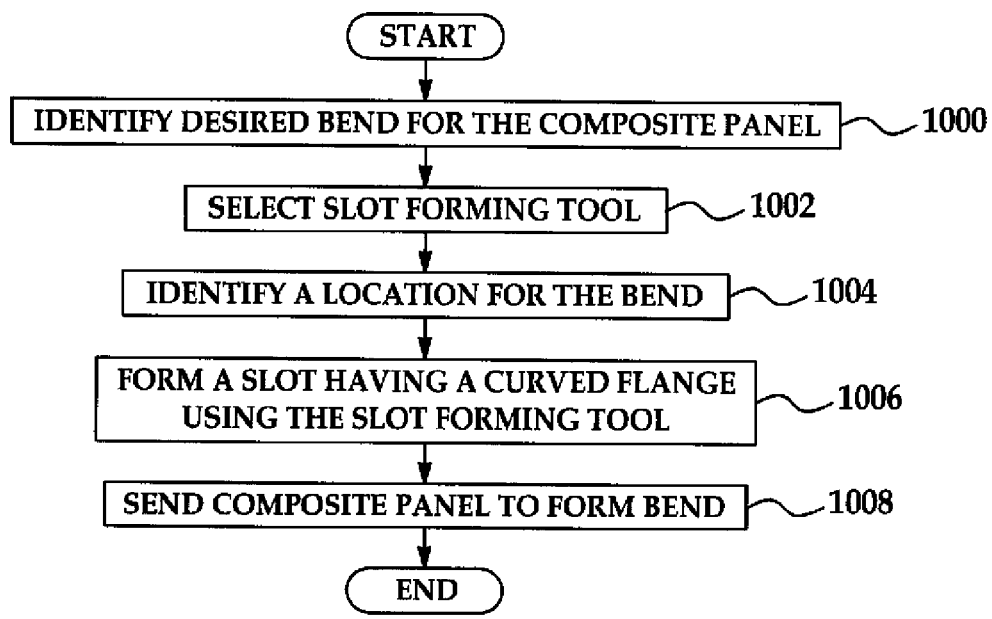
FIG. 10 is a flowchart of a process for forming a bend in a composite panel in accordance with an advantageous embodiment.

With reference now to FIG. 10, a flowchart of a process for forming a bend in a composite panel is depicted in accordance with an advantageous embodiment. The process, in this example, may be performed using components, such as slot forming tool 300 and bending tool 310 in FIG. 3, or other suitable tools. These tools may be used to create a composite panel, such as composite panel 500 in FIG. 5, in an angled shape as illustrated in FIG. 8.

The process begins by identifying a desired bend or angled shape for the composite panel (operation 1000). In the different illustrative examples, the bend may be a ninety degree bend for the composite panel. Of course, bends of other angles may be selected for the angled shape of the composite panel. For example, without limitation, the bend in the composite panel may be seventy degrees, one-hundred twenty degrees, or some other suitable angle. Limitations on bend angles may be present based upon the core and the face sheet thickness.

The process then selects a slot forming tool (operation 1002). In these examples, the slot forming tool may be a router with particular cutter that has an appropriate shape or some other suitable tool to form a slot with a curved flange that is appropriate for the desired angle in the bend. Thereafter, a location for the bend is identified (operation 1004).

The process then forms a slot having a curved flange in the composite panel using the slot forming tool (operation 1006). The slot forming tool forms a slot across one width of the composite panel. Thereafter, the process bends the composite panel to form the bend for the angled shape of the composite panel (operation 1008), with the process terminating thereafter. In this example, the bend may optionally be made using bending tool 310 in FIG. 3. Once the composite panel is bent, the composite panel in the bent shape may be installed or attached in a location. These composite panels may be used for various components, such as, for example, without limitation, a closet of an aircraft. When the portions of the composite panel are secured or fastened in place, the bend radius may maintain its shape without any fillers or additional reinforcements.

Further, if the radius bend and/or angle of the composite panel changes, a redesign of the composite panel is unnecessary. A selection or creation of a new tool with selected values for the bend slot width and the bend slot allowance may be used to form a slot that can be bent at the desired radius bend and/or angle. Also, the shape for the slot may be formed in a single pass of a tool and does not require any complex cutting of tabs.

Thus, the different advantageous embodiments provide a method and apparatus for forming a bend in a composite panel. The process may form a bend in the composite panel by identifying the location of the bend, forming a slot having a curved flange, and bending the panel to form the bend.

Further, although the different advantageous embodiments have been shown with respect to a composite panel, the different processes may be applied to other types of panels. For example, this type of process may be applied to a panel of sheetrock, plywood with a plastic laminate, or other suitable materials. The panel may be a solid panel or may have a solid core, depending on the particular implementation.

The different advantageous embodiments also allow for different radius bends to be used. The radius bends may be large, such as, for example, a radius bend that is around 3.4 times the thickness of the panel. These large bends are provided using the different advantageous embodiments without requiring extra tooling or fillers to be placed into the panel to hold or maintain the shape of the radius bend.

Figure 11:
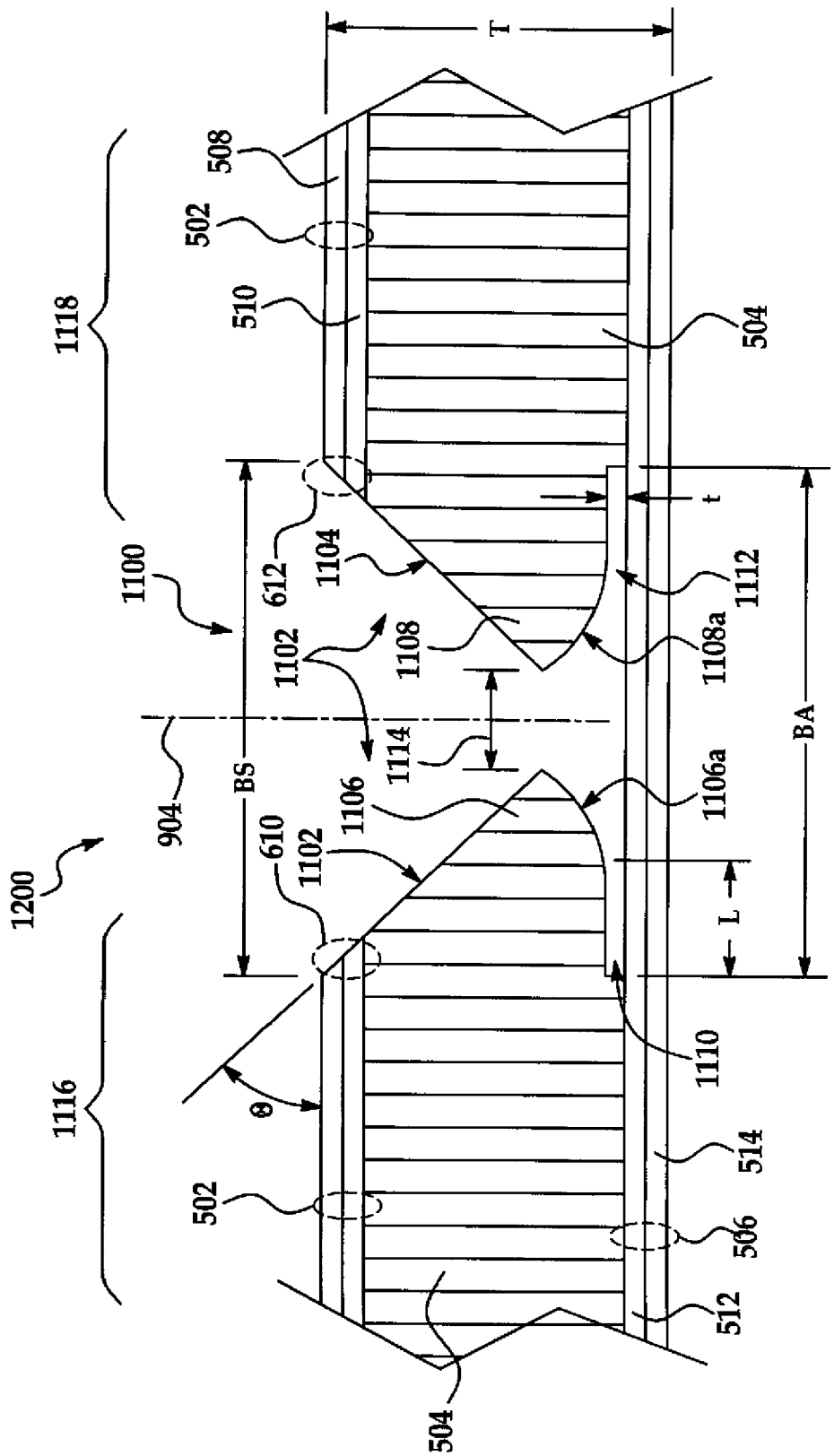
FIG. 11 is a cross section illustration of a composite panel having a slot formed therein according to another embodiment.

Attention is now directed to FIGS. 11 and 12 which illustrate an alternate embodiment of a composite panel 1200, shown in a flat state before a bend has been formed therein. The panel 1200 includes a slot 1100 therein which extends longitudinally along a longitudinal axis 1202. The slot 1100 passes through a first, inner facesheet 502 and a core 504 which is sandwiched between the first inner facesheet 502 and an outer, common second facesheet 506. The slot 1100 includes an allowable slot width BS, and a band/allowance width BA, similar to embodiments of slots previously described in connection with FIGS. 3-10. The slot 1100 essentially divides the panel 1200 into first and second panel sections 116, 118 which, as will be discussed below, may be rotated about the longitudinal axis 1202 of the slot 1100 in order to form a bend 1600 (FIG. 16) in the panel 1200.

The slot 1100 includes a generally V-shaped portion 1120 formed by surfaces 1102, 1104 which are oppositely inclined from each other relative to the plane of the facesheet 502, at an angle θ. The angle θ is substantially one half of the final angle of the bend 1600, indicated by the letter "A" in FIG. 16. The lower extremities of the inclined surfaces 1102, 1104 are spaced apart a predetermined distance indicated at 1114. The features of the slot 1100 are substantially symmetric about an axis 904 passing through the center of the slot 1100, and normal to the facesheets 502, 506, however, in other embodiments, it is possible that these features may be asymmetric.

The slot 1100 further includes a pair of curved flanges 1106, 1108 which respectively include curved surfaces 1106a, 1108a beneath and contiguous to the lower extremities of the incline surfaces 1102, 1104. Finally, the slot 1100 includes thin undercuts 1110, 1112 in the core 504 along the inside wall of the common facesheet 506 and beneath the curved flanges 1106, 1108 respectively. The undercuts 1110, 1112 each have a length "L" and thickness "t" selected to facilitate bending of the common facesheet 506.

Figure 15:
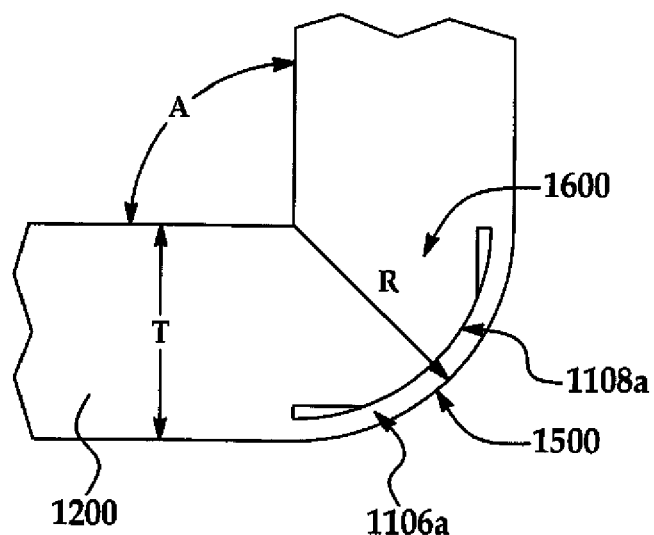
FIG. 15 is a diagrammatic illustration showing the position of the curved flanges after the bend has been formed.

Referring now to FIGS. 13 and 15, each of the curved surfaces 1106a, 1108a includes a radius "r" (FIG. 13) that is proportionally related to the radius R of the bend radius 1500, shown in FIG. 15. The curved surfaces 1106a, 1108a conformally engage and support the outer, common facesheet 506 along the bend radius 1500.

Figure 16:
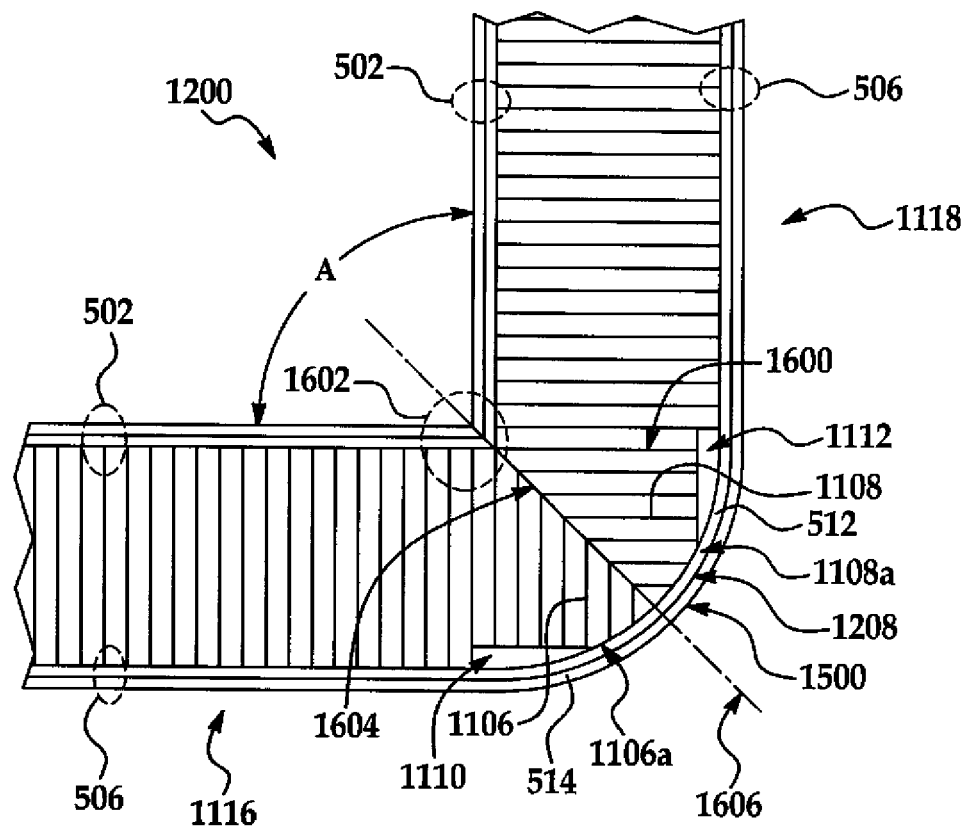
FIG. 16 is a sectional view of the joint formed by closing the slot shown in FIG. 11 after the panel has been bent to the desired angle.

As previously indicated after the slot 1100 is formed from the panel 1200, one or both of the panel sections 1116, 1118 is bent about the longitudinal axis 1202 of the slot 1100 until the panel 1200 has been bent to a desired angle "A" to produce a substantially closed, void-free joint 1600 shown in FIG. 16.

Referring to FIGS. 14a-14c, as a panel section 1116 is rotated during bending in the direction of the arrow 1400 the curved surface 1106a of the curved flange 1106 initially contacts and then assists in deforming the common facesheet 506 until the bend radius 1500 is fully formed. The curved surface 1106a effectively acts as an anvil about which a portion of the bend radius 1500 is formed. As best seen in FIG. 14c, when the bend radius 1500 has been fully formed, the curved surface 1106a of the curve flanges 1106 conformally engages a common facesheet 506 substantially along the entire length of the curved surface 1106a.

FIG. 16 illustrates the bend radius 1500 having been fully formed in the panel 1200, to produce a substantially void free joint 1600 between the panel sections 1116, 1118 in the area of the slot 1100. The core 504 substantially fills the entire area between the common facesheet 506 and the inner facesheet 502 in the area of the joint 1600, without the need for adding a filler. As indicated at 1602, the edges 610, 612 (FIG. 11) of the first, inner facesheet tightly abut each other and the inclined surfaces 1102, 1104 (FIG. 11) are engaged in substantially face-to-face contact as indicated by the joint plane 1604 in FIG. 16 which passes through the center 1606 of the bend radius 1500. The curved surfaces 1106a, 1108a of the flanges 1106, 1108 conformally engage and support the common facesheet 506 in the area of the bend radius 1500. In some embodiments, small portions of the undercut areas 1110, 1112 may remain present but in other embodiments, these open areas may be substantially closed during the bending process. In any event, the undercut areas 1110, 1112 may be made sufficiently thin so as to not materially affect the structural strength of the joint 1600.

Figure 17:
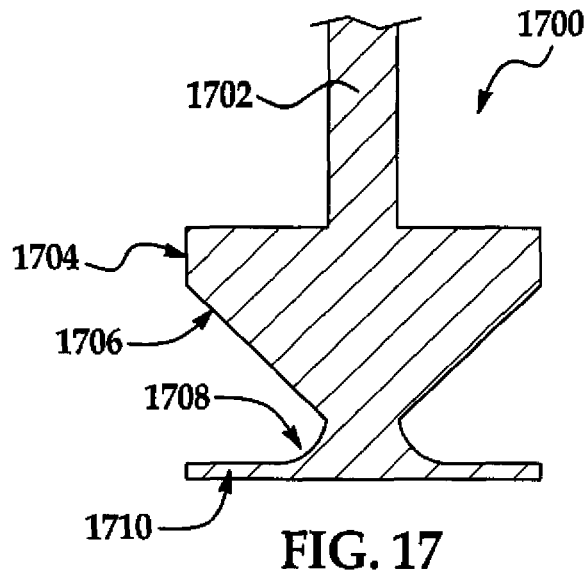
FIG. 17 is a cross sectional view of a cutting tool that may be used to form the slot shown in FIG. 11.

FIG. 17 illustrates a cross sectional view of a typical cutting tool that may be employed to form the slot 1100 shown in FIG. 11. The cutting tool 1700 includes a shank 1702 that may be held in the spindle (not shown) of any suitable machine tool (not shown), and a girdle 1704. The cutting tool 1700 further includes an inwardly tapering surface 1706 for forming the inclined surfaces 1102, 1104, a radiused waist 1708 for forming the curve surfaces 1106a, 1108a, and a lower flange 1710 for forming the undercuts 1110, 1112.

Figure 18:
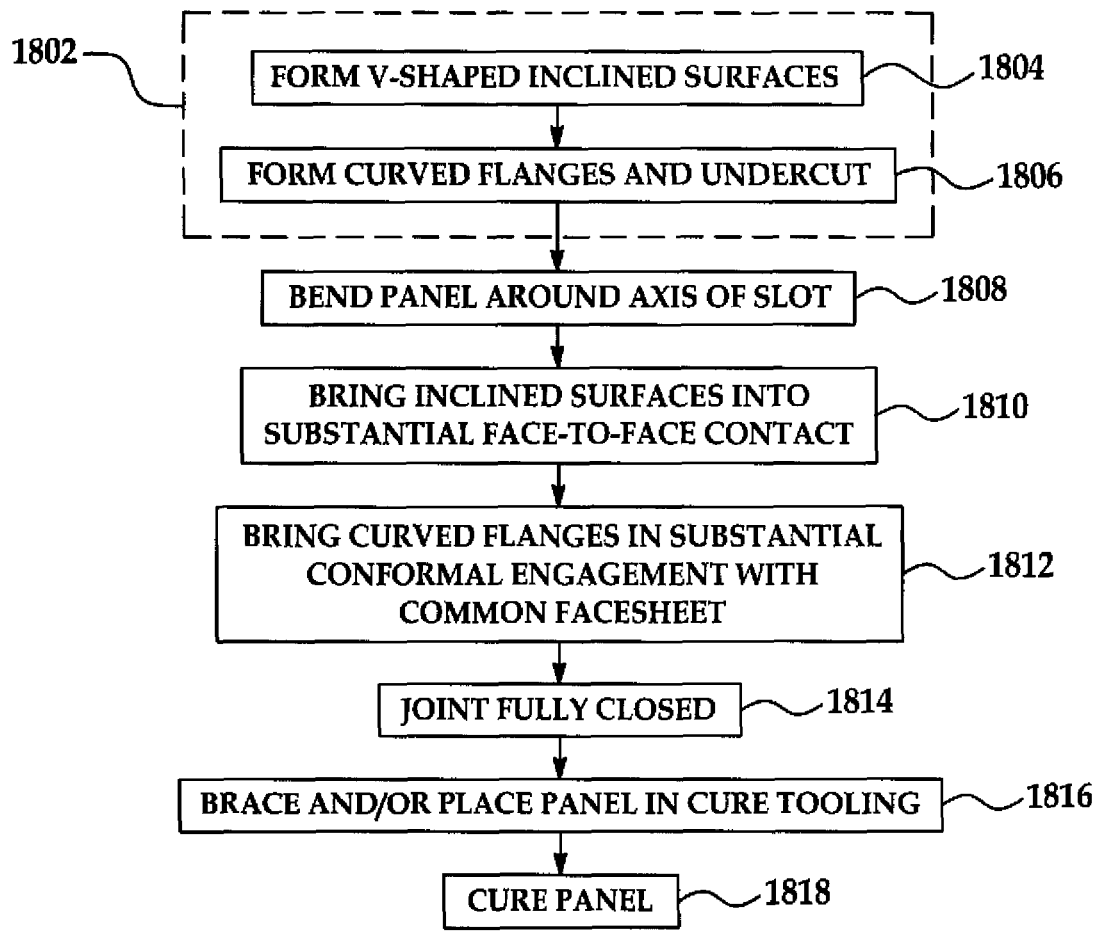
FIG. 18 is a flow diagram illustrating a method for forming a bend in a composite panel.

Attention is now directed to FIG. 18 which broadly illustrates the steps of a method for forming a substantially void-free bend radius 1500 in a composite panel. First, a slot 1100 is formed in the panel 1200, as shown at 1802. Forming the slot 1100 includes forming the V-shaped inclined surfaces 1102, 1104, as shown at 1804 and forming the curved flanges 1106, 1108, along with the undercuts 1110, 1112, as illustrated at step 1806. As previously indicated, steps 1804 and 1806 may be carried out substantially simultaneously using a single cutting tool 1700 to cut the slot 1100, generally in a single pass.

Next, at 1808, the panel 1200 is bent around the longitudinal axis 1202 of the slot 1100 until the panel sections 1116, 1118 form a desired bend angle "A". As step 1808 is completed, the inclined surfaces 1102, 1104 which include portions of the core 504 as well as the edges 610, 612 of the first inner facesheet 502 are brought into face-to-face contact, over substantially their entire surface areas. Substantially simultaneous with step 1810, the curved flanges 1106, 1108 are brought into conformal engagement with the common facesheet 506, as indicated at step 1812. At this point, as shown at 1814, the joint 1600 is fully closed. A brace (not shown) may be applied around either the inside or the outside corner of the bend in the panel 1200 in order to hold the joint 1600 in place, or alternatively, the bent panel 1200 may be placed in suitable cure tooling (not shown) to hold the shape of the panel 1200, as indicated at 1816, until the panel 1200 is fully cured. Finally, at step 1818, the panel 1200 is cured which results in consolidation of the joint 1600 thereby permanently setting the bend radius 1500 in the panel 1200.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite panel having a curved bend therein, consisting essentially of:
   a first panel section comprising a first core section having a first inclined surface and a first flange formed therein, the first core section sandwiched between a common facesheet and a first separate facesheet;
   a second panel section comprising a second core section having a second inclined surface and a second flange formed therein, the second core section completely divided from the first core section by a slot, the slot forming the first inclined surface and the second inclined surface, the second core section sandwiched between the common facesheet and a second separate facesheet, the common facesheet forming an outer arcuate surface of the curved bend; and
   a substantially void-free joint between the first panel section and the second panel section, in which the joint includes the first inclined surface and the second inclined surface engaged in substantially face-to-face contact along a plane passing through the radius of the curved bend.

2. The composite panel of claim 1, wherein the joint includes the first curved flange and the second curved flange, the first curved flange and the second curved flange conformally engaging and supporting the common facesheet in an area of the outer radius of the curved bend.

3. The composite panel of claim 1, wherein the radius of the curved bend is substantially equal to a thickness of the panel.

4. The composite panel of claim 1, wherein the first core section and the second core section substantially fill an entire area of the void-free joint.

5. The composite panel of claim 1, wherein the first core section further comprises a first curved surface contiguous to the first inclined surface, wherein the second core section further comprises a second curved surface contiguous to the second inclined surface, and wherein the first curved surface and the second curved surface engage and support the common face sheet in the area of the bend.

6. The composite panel of claim 1, wherein the first core section and the second core section substantially fill an entire area between the common facesheet and the first common facesheet and the second common facesheet in an area of the joint.

7. For use in producing aircraft structures, a composite panel having a bend therein formed by a substantially void free joint, consisting essentially of:
   a first composite panel comprising
      a first inner facesheet having a first edge, a common facesheet, and
      a first core section sandwiched between the first inner facesheet and the common facesheet, the first core section having a first inclined surface and a first flange formed therein; and,
   a second composite panel comprising a second inner facesheet having a second edge, the common facesheet, and a second core section sandwiched between the second inner facesheet and the common facesheet, the second core section having a second inclined surface and a second flange formed therein, the second core section completely divided from first core section by a slot between the first core section and the second core section,
   the first flange and the second flange engaging and supporting the common facesheet in the area of the bend,
   the first edge and the second edge joined together at the bend,
   the first inclined surface and the second inclined surface joined together at the bend, the first core section and the second core section substantially filling an entire area between the common facesheet and the first and second inner facesheets in the area of the bend.

* * * * *